(12) United States Patent
Yunes

(10) Patent No.: US 6,796,406 B1
(45) Date of Patent: Sep. 28, 2004

(54) DISC BRAKE COVER

(76) Inventor: Franklin Yunes, A/O Engineering, Inc., 19523 Delaware Cir., Boca Raton, FL (US) 33434

( * ) Notice: Subject to any disclaimer, the term of this patent is extended or adjusted under 35 U.S.C. 154(b) by 0 days.

(21) Appl. No.: 10/714,044

(22) Filed: Nov. 17, 2003

(51) Int. Cl.$^7$ ............................................... F16D 65/10
(52) U.S. Cl. .............................. 188/218 A; 301/37.105; 301/37.101
(58) Field of Search ................... 188/264 A, 264 AA, 188/218 A, 218 R; 301/37.105, 37.101

(56) References Cited

U.S. PATENT DOCUMENTS

| | | | |
|---|---|---|---|
| 4,005,768 A | | 2/1977 | Bubnash et al. |
| 4,164,273 A | | 8/1979 | McElroy |
| 4,360,083 A | * | 11/1982 | Weisman ................. 188/218 A |
| 4,473,139 A | | 9/1984 | Oka et al. |
| 4,484,667 A | * | 11/1984 | Bottieri, Jr. ............. 188/218 A |
| 5,772,286 A | * | 6/1998 | Jordan .................... 301/37.104 |
| 6,047,796 A | * | 4/2000 | Fitzgerald ............... 188/218 A |
| 6,155,650 A | * | 12/2000 | Barger ......................... 301/6.3 |
| 6,318,809 B1 | * | 11/2001 | Bennett ................. 301/37.101 |
| 6,371,569 B1 | | 4/2002 | Dean |
| 2002/0167217 A1 | * | 11/2002 | Higgins ................. 301/37.105 |

* cited by examiner

Primary Examiner—Robert A. Siconolfi
Assistant Examiner—Devon Kramer
(74) Attorney, Agent, or Firm—Oltman, Flynn & Kubler

(57) ABSTRACT

A disc brake cover that is perforated to receive the outboard end of the hub of the disc brake and attachment members for connecting the cover and a vehicle wheel to the disc brake rotor. The cover extends radially outward beyond the outboard end face of the brake rotor hub and is imperforate there to shield the brake from view through openings in the wheel.

6 Claims, 3 Drawing Sheets

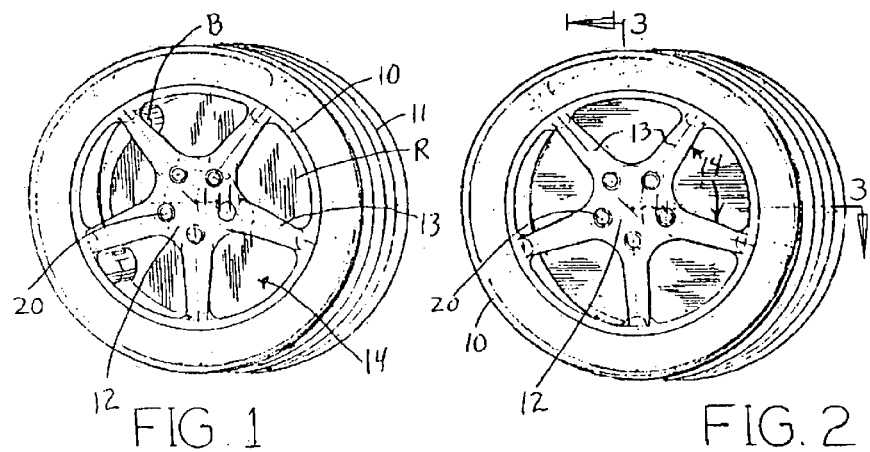
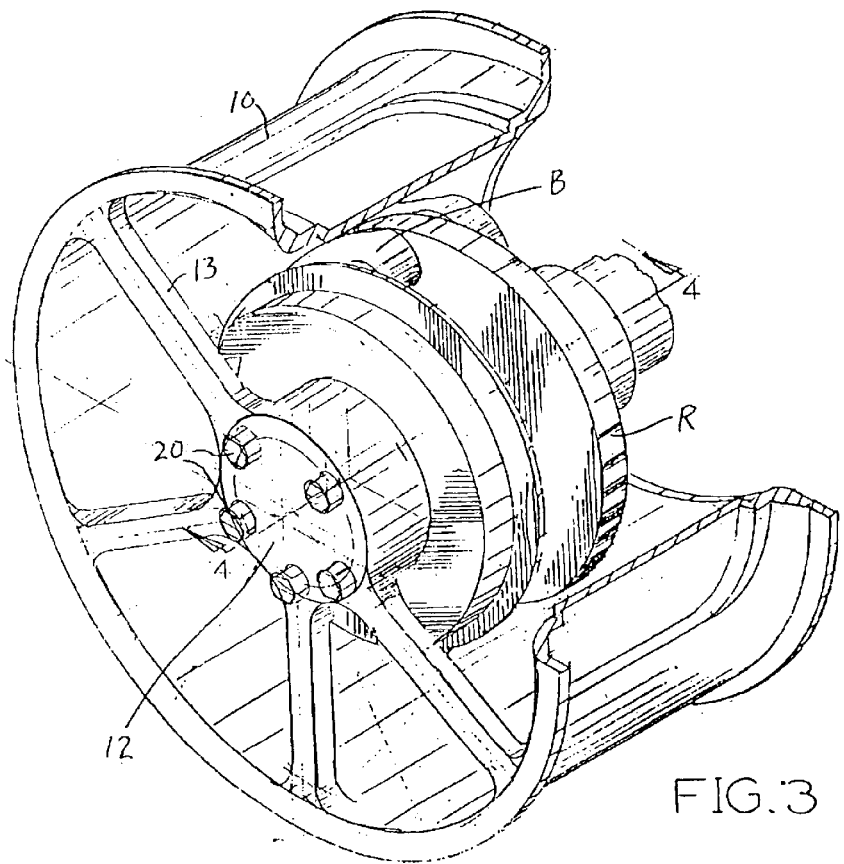
FIG. 1  FIG. 2  FIG. 3

DISC BRAKE COVER

BACKGROUND OF THE INVENTION

1. Field of the Invention

This invention relates to a cover in a wheel and disc brake assembly on an automotive vehicle.

2. Prior Art

Various brake covers, shields and filters have been proposed heretofore for use on automotive vehicles. For example, U.S. Pat. No. 6,047,796 to Fitzgerald discloses a dust cover mounted on the inboard side of a vehicle wheel and having a complex shape on its outboard side complementary to the wheel spokes and having air circulating fins on its inboard side. Bottieri U.S. Pat. No. 4,484,286 discloses an annular dust shield plate of dished cross-section clamped against the outboard side of the rotor of a disc brake. Barger U.S. Pat. No. 6,155,650 discloses a cover attached to the outboard side of a disc brake inside the vehicle wheel and presenting a cylindrical wall at its periphery which is formed with openings partly covered by air-scooping louvers. Similarly, Dean U.S. Pat. No. 6,371,569 B1 discloses a cover attached to the outboard side of a disc brake and presenting radially elongated openings which are partly covered by curved louvers acting as air scoops.

Jordan U.S. Pat. No. 5,772,286 discloses a filter unit mounted on the outboard side of a disc brake.

Bubnash et al U.S. Pat. No. 4,005,768 and Oka et al U.S. Pat. No. 4,473,139 each show a dust shield at the inboard side of a disc brake.

McElroy U.S. Pat. No. 4,164,213 discloses a shield for a drum brake on an automotive vehicle.

SUMMARY OF THE INVENTION

The present invention is directed to a cover for use in a wheel and disc brake assembly, particularly one with a wheel with large openings through which the rotor and caliper of the disc brake can be seen, detracting from the aesthetic appearance of the wheel A principal object of this invention is to provide a novel and advantageous disc brake cover of simplified construction which adapts it for ready attachment to, the rotor of the disc brake on the outboard side. It has no air circulation openings and no air scoop louvers, and it does not have a complex curvature, and consequently it can be produced at low cost. Despite its structural simplicity, the present cover is highly effective in achieving its primary purpose of providing a visually attractive shield for the operating parts of the disc brake on that wheel.

In accordance with this invention, the brake cover is imperforate where it extends completely across the outboard side of the disc brake, making it a structurally simple but highly effective, an aesthetically attractive shield for the less attractive operating parts of the disc brake.

Further objects and advantages of this invention will be apparent from the following detailed description of two presently preferred embodiments thereof with reference to the accompanying drawings.

BRIEF DESCRIPTION OF THE DRAWINGS

FIG. 1 is a perspective view showing a wheel, tire and disc brake assembly in accordance with the prior art;

FIG. 2 is a similar view showing the same assembly modified by the addition of a cover in accordance with a first embodiment of the present invention;

FIG. 3 is a perspective view showing the FIG. 2 assembly broken open along the line 3-3;

DETAILED DESCRIPTION OF THE INVENTION

Figures 4, 5:
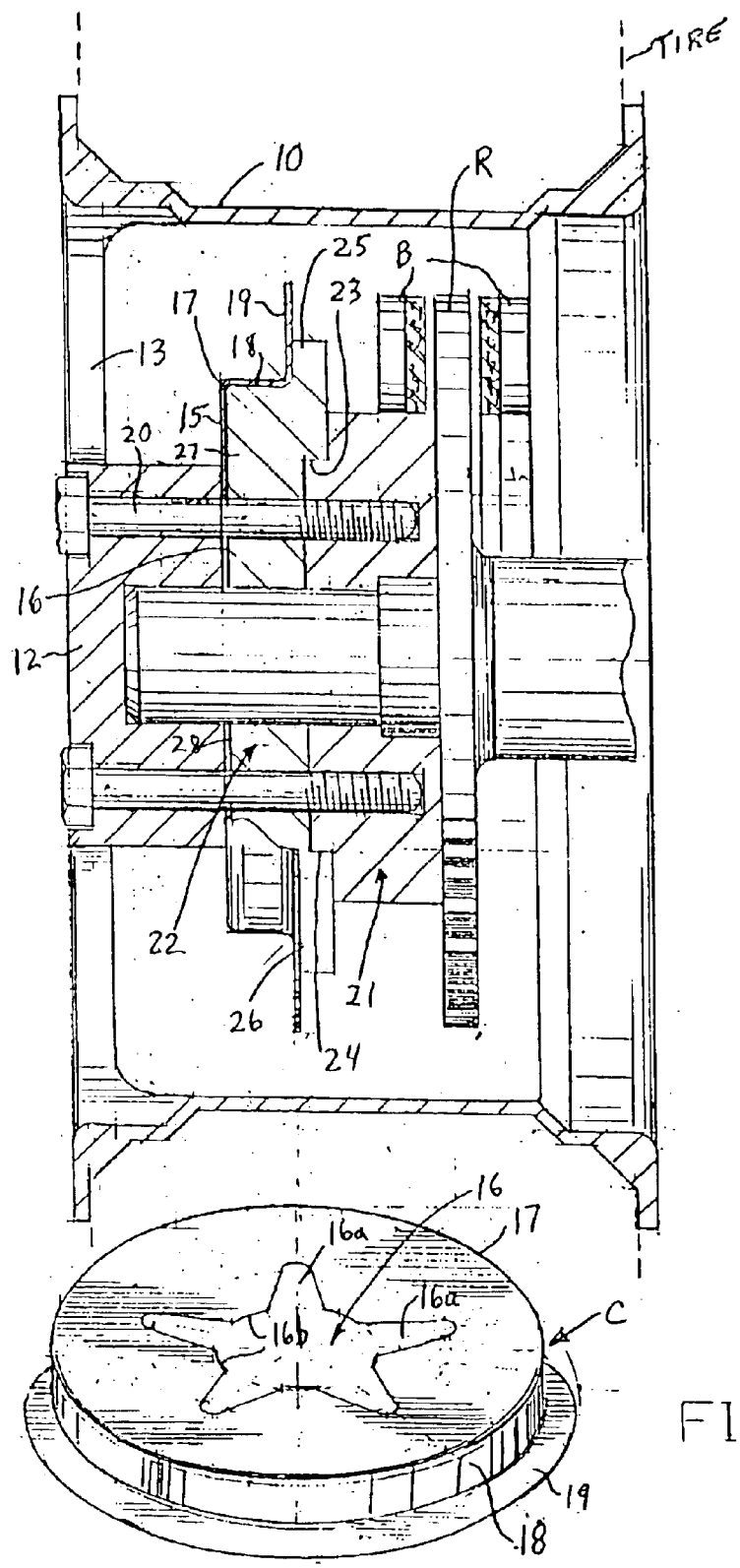
FIG. 4 is an axial section taken along the line 4-4 in FIG. 3.
FIG. 5 is a perspective view of the cover of FIGS. 2–4 in accordance with the first embodiment of this invention.
Figure 7:
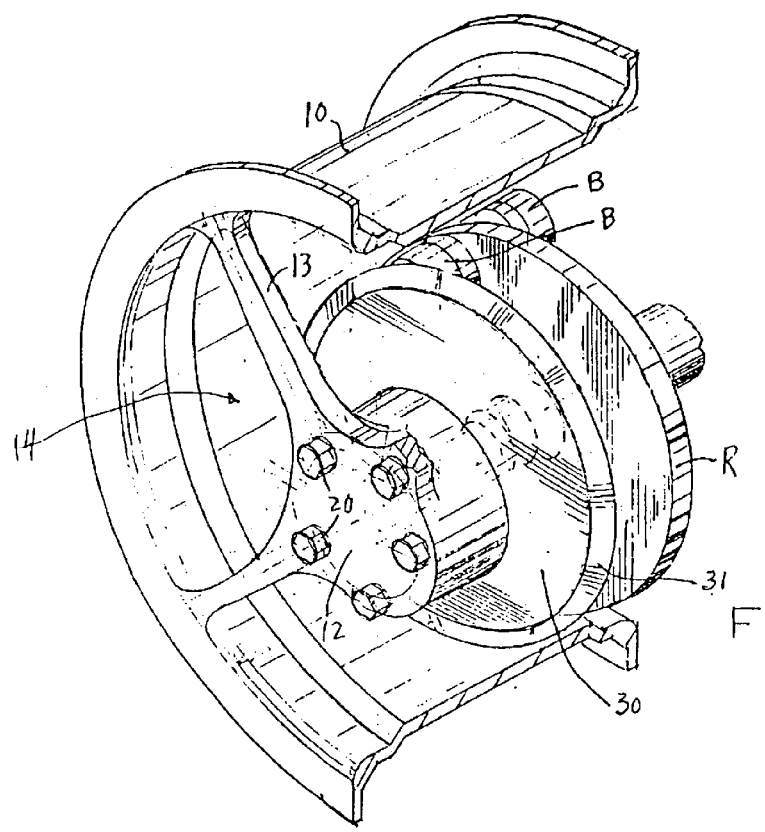
FIG. 7 is a view similar to FIG. 3 and showing the cover according to the second embodiment of the invention in the wheel, tire and disc brake assembly.

Before explaining the present invention in detail it is to be understood that the invention is not limited in its application to the particular arrangements shown and described since the invention is capable of other embodiments. Also, the terminology used herein is for the purpose of description and not of limitation.

FIG. 1 shows the assembly of a wheel, disc brake and tire on a 1997 C5 Corvette®. The wheel has an annular outer rim 10 carrying the usual tire 11, a central inner hub 12, and five radial arms or spokes 13 extending out from the central hub to the outer rim. Each of the arms 13 is relatively narrow circumferentially, and the wheel presents arcuate openings 14 between these arms which are much wider circumferentially than the arms 13 themselves. Axially inboard from the wheel behind the radial arms is located a conventional disc brake having a flat-faced cylindrical rotor disc R and a brake caliper B, both of which are exposed and readily visible through the wide openings 14 in the wheel in the absence of the present cover.

In accordance with the present invention, a novel, structurally simple arrangement is provided for covering the disc brake on its axially outboard side so as to enhance the appearance of the wheel by hiding the disk brake from view while still retaining the aesthetic attributes of the relatively open configuration of the wheel, as well as to shield it from damage by road water, pebbles or other foreign matter that might pass through the wheel openings 14 from the outside.

FIG. 5 shows a cover C in accordance with a first embodiment of this invention for attachment to the wheel and brake assembly of FIG. 1. The cover presents a flat, outboard, first wall 15 that is centrally apertured at a generally star-shaped opening 16, which has five circumferentially spaced tapered portions 16a extending radially out from a circular central portion 16b. The outboard first wall 15 of cover C has a circular periphery 17 and there it is joined to an axially inwardly extending, cylindrical, second wall 18. The inboard edge of this second wall is joined to a flat, annular, radially outwardly projecting, third wall 19 at the inboard side of the cover. The cover preferably is made of shiny-surfaced metal or visually attractive plastic of any suitable color.

As shown in FIG. 4, the central hub 12 of the wheel is attached to the brake rotor assembly by attachment members in the form of five bolts 20 which pass individually through respective radial portions 16a of the cover opening 16. The brake rotor assembly has the rotor disc R and a two-piece central hub 21, 22. The brake rotor hub comprises a thick first body 21 of stepped cylindrical configuration affixed to the axially outboard face of rotor disc R and a smaller second body 22 of stepped cylindrical configuration which presents a cylindrical recess 23 in its axially inboard side that snugly receives a complementary cylindrical projection 24 on the outboard side of body 21. The second body 22 of the brake rotor hub presents a cylindrical segment 25 of relatively large diameter at its inboard side, a flat annular radial shoulder 26 on the outboard face of segment 25, and a cylindrical segment 27 of smaller diameter projecting axially outward from shoulder 26 and itself presenting a flat, annular, radially extending, outboard face 28.

The cover C fits snugly but slidably on the second body 22 of the brake rotor hub, with its inboard wall 19 engaging the annular outboard face 26 of body 22 of the brake rotor hub, its annular second wall 18 fitting snugly but slidably over the smaller cylindrical segment 27 of body 22, and its outboard first wall 15 engaging the outboard face 28 of body 22 across the complete extent of the latter. The inboard third wall 19 of the cover extends radially slightly beyond the rotor disc R and brake caliper B of the disc brake to shield them from view through the wheel openings 14. The bolted-on central hub 12 of the wheel clamps the cover C in this position, so that the cover is sandwiched between the wheel hub 12 and the hub of the brake rotor.

It is to be understood that in place of bolts, as shown, the attachment members for the present cover can be screw-threaded lugs projecting outboard from that hub for the attachment of lug nuts to clamp the cover and the wheel to the rotor of the disc brake.

Also, while the generally star-shaped opening 16 in the cover is ideally suited for enabling its ready attachment to the hub of the brake rotor, it is to be understood that, if desired, it may be replaced by a circular opening for receiving the brake rotor hub and individual openings for receiving the attachment members (e.g., bolts 20).

Figures 6, 8:
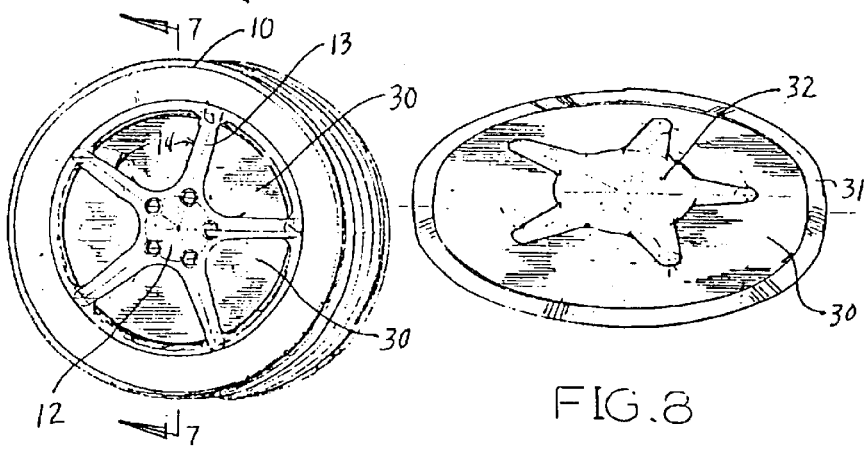
FIG. 6 is a view similar to FIG. 2 and showing in the wheel, tire and disc brake assembly a cover in accordance with a second embodiment of the present invention.
FIG. 8 is a perspective view of the cover in accordance with the second embodiment of the invention.

The second embodiment of this invention (FIG. 8) is of even greater structural simplicity. It has a flat, circular, outboard wall 30 of about the same width as the disc brake assembly. An annular flange or lip 31 is joined to the circular periphery of wall 30 and projects inboard from it at an acute angle, preferably, in close proximity to the periphery of the disc brake assembly. The wall 30 has a generally star-shaped opening 32 identical to the opening 16 in the first embodiment, and for the same purpose.

In both embodiments the portions of the cover which are radially beyond the outboard end face of the brake rotor hub are imperforate, thus constituting a structurally simple shield for the operating parts of the brake to hide them from view.

I claim:

1. A cover for attachment to a vehicle wheel and disc brake assembly having: a wheel with a central hub, circumferentially spaced arms extending radially out from said hub, an annular outer rim for holding a vehicle tire, and circumferentially elongated openings bounded by said hub, said circumferentially spaced arms and said rim; a disc brake with a rotor having a central hub of larger diameter than said wheel hub, said hub of the brake rotor having a flat outboard end face; and attachment members for connecting said hub of the wheel to said hub of the brake rotor;

said cover comprising: a flat first wall apertured to receive said hub of the brake rotor and said attachment members, said flat first wall of the cover engaging and completely covering said outboard end face of said hub of the brake rotor; said cover extending radially outward beyond said outboard end face of said hub of the brake rotor and being completely imperforate across its extent radially beyond said outboard end face of said hub of the brake rotor to shield substantially the entire disc brake from view through said openings in the wheel, said cover having an annular second wall extending perpendicularly inboard from an outer periphery of the first wall and positioned and dimensioned to snugly but slidably receive said hub of the brake rotor inboard from said outboard end face thereof; and a flat annular third wall extending radially out from an inboard edge of said second wall.

2. A cover for attachment to a vehicle wheel and disc brake assembly having: a wheel with a central hub, circumferentially spaced arms extending radially out from said hub, an annular outer rim for holding a vehicle tire, and circumferentially elongated openings bounded by said hub, said circumferentially spaced arms and said rim; a disc brake with a rotor having a central hub of larger diameter than said wheel hub, said hub of the brake rotor having a flat outboard end face; and attachment members for connecting said hub of the wheel to said hub of the brake rotor;

said cover comprising: a flat first wall apertured to receive said hub of the brake rotor and said attachment members, said flat first wall of the cover engaging and completely covering said outboard end face of said hub of the brake rotor; said cover extending radially outward beyond said outboard end face of said hub of the brake rotor and being completely imperforate across its extent radially beyond said outboard end face of said hub of the brake rotor to shield substantially the entire disc brake from view through said openings in the wheel; wherein said first wall extends substantially completely across said brake rotor and further comprising an imperforate annular flange joined to an outer periphery of the first wall and extending inboard therefrom.

3. A cover according to claim 1, wherein said first wall of the cover has a generally star-shaped opening therein with a circular central portion positioned and dimensioned to snugly but slidably receive said hub of the brake rotor and a plurality of circumferentially spaced radial portions extending out from said central portion and positioned and dimensioned to pass said attachment members.

4. In combination with a wheel with a central hub, circumferentially spaced arms extending radially out from said hub, an annular outer rim for holding a vehicle tire, and circumferentially elongated openings bounded by said hub, said circumferentially spaced arms and said rim;

a disc brake with a rotor having a central hub of larger diameter than said wheel hub, said hub of the brake rotor having a flat outboard end face;

and attachment members for connecting said hub of the wheel to said hub of the brake rotor;

the improvement which comprises a cover for said disc brake comprising: a flat first wall apertured to receive said hub of the brake rotor and said attachment members, said flat first wall of the cover engaging and completely covering said outboard end face of said hub of the brake rotor, said cover extending radially outward beyond said outboard end face of said hub of the brake rotor and being completely imperforate across its extent radially beyond said outboard end face of said hub of the brake rotor to shield substantially the entire disc brake from view through said openings in the wheel, said cover having an annular second wall extending perpendicularly inboard from an outer periphery of the first wall and positioned and dimensioned to snugly but slidably receive said hub of the brake rotor inboard from said outboard end face thereof, and a flat annular third wall extending radially out from the inboard edge of said second wall.

5. In combination with a wheel with a central hub, circumferentially spaced arms extending radially out from said hub, an annular outer rim for holding a vehicle tire, and circumferentially elongated openings bounded by said hub, said circumferentially spaced arms and said rim;

a disc brake with a rotor having a central hub of larger diameter than said wheel hub, said hub of the brake rotor having a flat outboard end face;

and attachment members for connecting said hub of the wheel to said hub of the brake rotor;

the improvement which comprises a cover for said disc brake comprising: a flat fist wall apertured to receive said hub of the brake rotor and said attachment members, said flat first wall of the cover engaging and completely covering said outboard end face of said hub of the brake rotor, said cover extending radially outward beyond said outboard end face of said hub of the brake rotor and being completely imperforate across its extent radially beyond said outboard end face of said hub of the brake rotor to shield substantially the entire disc brake from view through said openings in the wheel, wherein said first wall of the cover extends substantially completely across said brake rotor, and said cover further comprises an imperforate annular flange joined to an outer periphery of the first wall and extending inboard therefrom.

6. In combination with a wheel with a central hub, circumferentially spaced arms extending radially out from said hub, an annular outer rim for holding a vehicle tire, and circumferentially elongated openings bounded by said hub, said circumferentially spaced arms and said rim;

a disc brake with a rotor having a central hub of larger diameter than said wheel hub, said hub of the brake rotor having a flat outboard end face;

and attachment members for connecting said hub of the wheel to said hub of the brake rotor;

the improvement which comprises a cover for said disc brake comprising: a flat first wall apertured to receive said hub of the brake rotor and said attachment members, said flat first wall of the cover engaging and completely covering said outboard end face of said hub of the brake rotor, said cover extending radially outward beyond said outboard end face of said hub of the brake rotor and being completely imperforate across its extent radially beyond said outboard end face of said hub of the brake rotor to shield substantially the entire disc brake from view through said openings in the wheel, wherein said first wall of the cover extends substantially completely across said brake rotor, and said cover further comprises an imperforate annular flange joined to an outer periphery of the first wall and extending inboard therefrom, wherein said first wall of the cover has a generally star-shaped opening therein with a circular central portion positioned and dimensioned to snugly but slidably receive said hub of the brake rotor and plurality of circumferentially spaced radial portions extending out from said central portion and positioned and dimensioned to pass said attachment members.

* * * * *